US011724578B2

(12) United States Patent
Chennupalli et al.

(10) Patent No.: US 11,724,578 B2
(45) Date of Patent: Aug. 15, 2023

(54) LIFTGATE OPERATION SYSTEMS AND METHODS

(71) Applicant: Ford Global Technologies, LLC, Dearborn, MI (US)

(72) Inventors: Girish Chennupalli, Farmington Hills, MI (US); Jeffrey Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 17/320,130

(22) Filed: May 13, 2021

(65) Prior Publication Data

US 2022/0364404 A1    Nov. 17, 2022

(51) Int. Cl.
*B60J 5/10*  (2006.01)
*G07C 5/08*  (2006.01)

(52) U.S. Cl.
CPC .......... *B60J 5/102* (2013.01); *G07C 5/0808* (2013.01); *G07C 5/0825* (2013.01); *E05Y 2400/354* (2013.01); *E05Y 2400/454* (2013.01); *E05Y 2400/818* (2013.01); *E05Y 2400/86* (2013.01); *E05Y 2900/546* (2013.01)

(58) Field of Classification Search
CPC ...... B60J 5/102; G07C 5/0808; G07C 5/0825; E05Y 2400/354; E05Y 2400/454; E05Y 2400/818; E05Y 2400/86; E05Y 2900/546
See application file for complete search history.

(56) References Cited

U.S. PATENT DOCUMENTS

| | | | |
|---|---|---|---|
| 2019/0323281 A1 | 10/2019 | Ghannam et al. | |
| 2020/0254928 A1* | 8/2020 | Monteiro | B60Q 9/00 |
| 2020/0256113 A1* | 8/2020 | Salter | B60J 5/101 |
| 2020/0392779 A1 | 12/2020 | Zhu et al. | |

FOREIGN PATENT DOCUMENTS

| | | |
|---|---|---|
| CN | 107117118 A | 9/2017 |
| CN | 109505484 A | 3/2019 |
| CN | 111779405 A | 10/2020 |
| KR | 20180076735 A | 7/2018 |

* cited by examiner

*Primary Examiner* — Joseph J Dallo
(74) *Attorney, Agent, or Firm* — Brandon Hicks; Eversheds Sutherland (US) LLP

(57) ABSTRACT

Multi-mode personal transportation and delivery devices and methods of use are disclosed herein. A method can include providing a preview of an opening height of a tailgate to a user, where the opening height is defined by a distance of liftgate that is measured relative to a ground plane, receiving feedback to adjust the opening height, creating a customized liftgate opening height from the feedback, and storing the customized liftgate opening height in a user account.

20 Claims, 5 Drawing Sheets

LIFTGATE OPERATION SYSTEMS AND METHODS

BACKGROUND

Many vehicles are equipped with liftgates that include an actuator, such as a button, which can be used to close the liftgate. Customers may prefer to have the liftgate open to a specific height in order to access the actuator. For example, a shorter person may prefer to have the liftgate open to a height that is lower than a relatively taller individual, allowing the shorter person access to the liftgate actuator. People with disabilities may also have difficulty using a liftgate if the height of the actuator is inaccessible.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
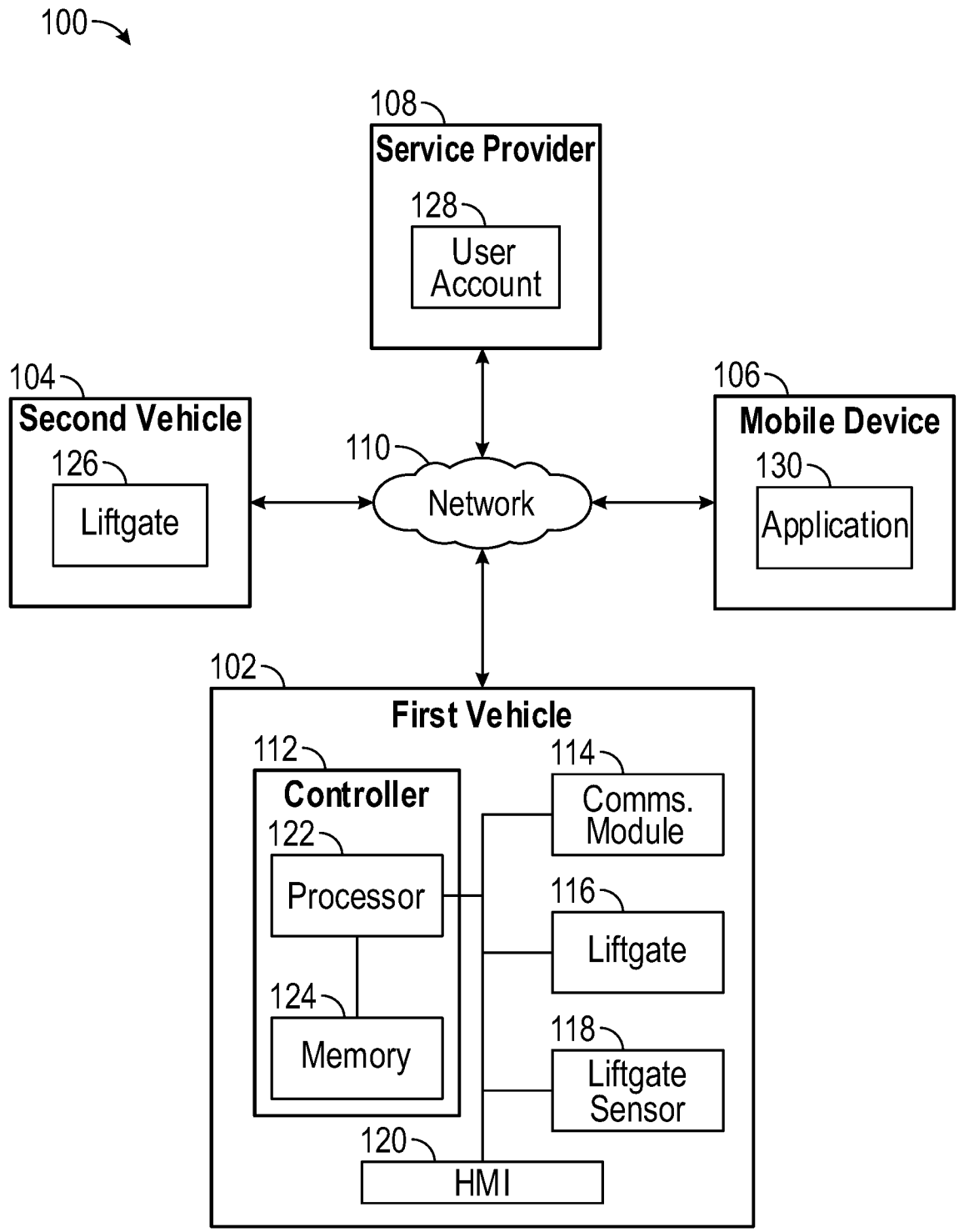
FIG. 1 illustrates an example architecture where the systems and method of the present disclosure may be practiced.

The present disclosure is directed to systems and methods for establishing customized liftgate heights across various vehicles. The systems and methods enable a user to set a common liftgate height for a user for any given vehicle. The system may use the customized liftgate height as the factor that is common among all vehicles. For example, if a customer selects a customized liftgate height for the liftgate for a first type of vehicle, the system may provide him/her the same customized liftgate height for a liftgate of a second type of vehicle. The customized liftgate height can be measured, from vehicle-to-vehicle, from a liftgate height to a ground plane to ensure consistency of liftgate openings across vehicles. This functionality can be integrated into an application, such as Ford Pass™, in some instances. The commonality among liftgate heights may reduce inconvenience to consumers when they use a different vehicle when the vehicles are linked to a common user account.

In some instances, one or more anthropometric measurements can be obtained directly from the user and can be used to approximate not only the customized liftgate height but also positions of mirrors, seats, and the steering wheel—just to name a few. Seat positions are selected taking into account several factors such as ergonomic seating position, which is the seat position that provides the best driving posture for the user.

In some instances, the user can enter their anthropometric measurements into the human-machine interface (HMI) or application. The user can also select their preferred customized liftgate height if known. If this option is selected by the user, a system of the present disclosure may allow the user to adjust the customized liftgate height relative to the ground plane by providing a preview on an HMI or mobile device. The user can customized a liftgate height in the application. The vehicle can automatically adjust the liftgate height simultaneously when the vehicle is turned on and the transmission is in park.

In addition, the driver can be given an option to choose the automatic liftgate height that is set by the vehicle based on the anthropometric measurements (e.g., driver height) of the driver provided in the application. Once the height is set and saved, it can be used by all the vehicles that the application account is associated with. The default is set to be the maximum height the liftgate can reach. This sequence can be used for seats, mirrors, and steering wheel as well.

One example method may involve prompting the user to provide their anthropometric measurements through the in-vehicle HMI or the application disposed on a user device, such as a smartphone or wearable. The user can be prompted to select if they prefer to use automated adjusted seat, mirrors, steering wheel, and open liftgate positions based on the anthropometric measurements. A preview of the liftgate height can be provided through the application or HMI. The user can then be prompted to use the customized liftgate height in the preview. Alternatively, the user can manually adjust the height using the HMI or the application.

Illustrative Embodiments

Figure 2:
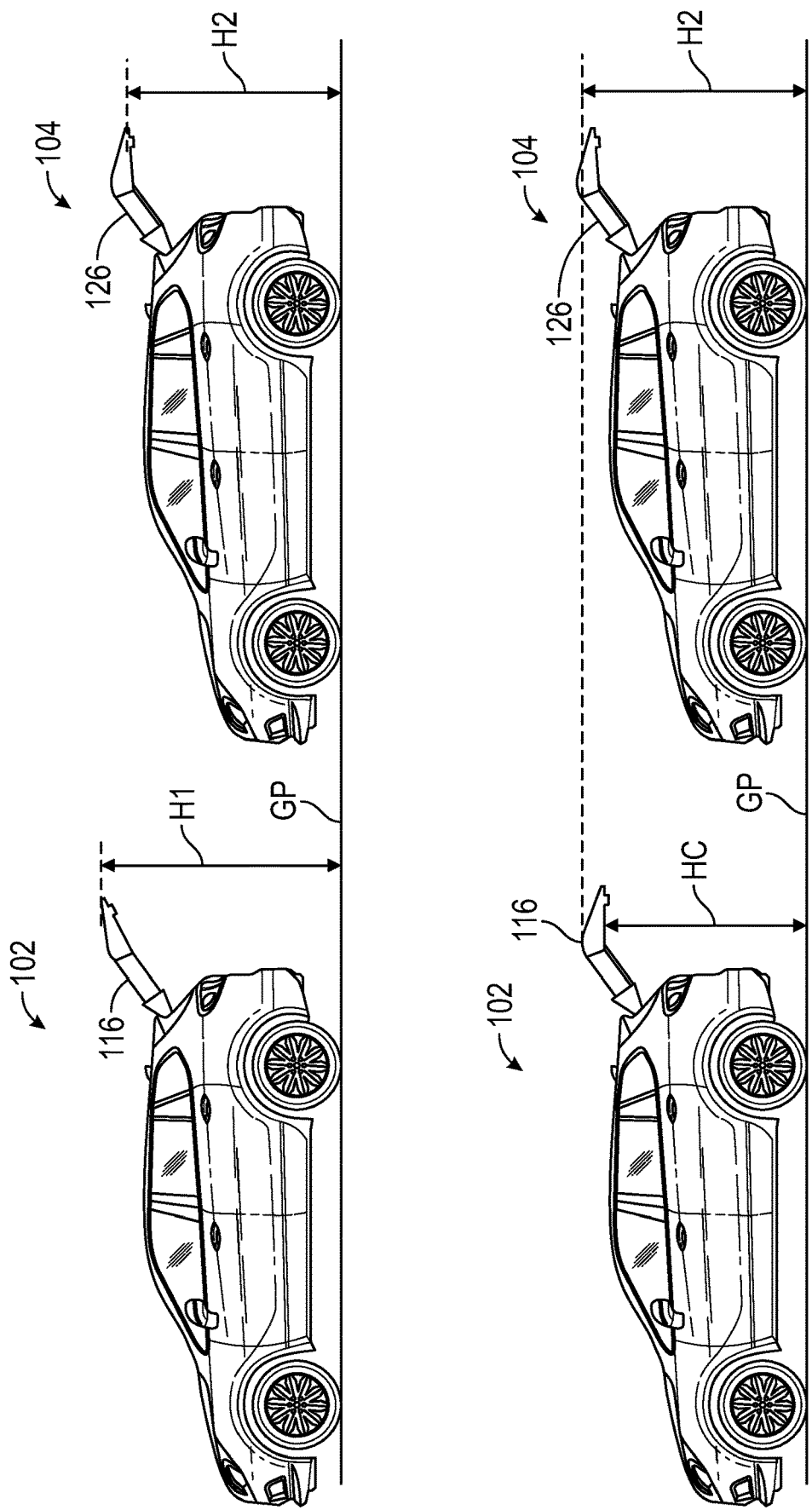
FIG. 2 illustrates the use of a customized liftgate opening height between two vehicles.

Turning now to the drawings, FIGS. 1 and 2 collectively depict an illustrative architecture 100 in which techniques and structures of the present disclosure may be implemented. The architecture 100 includes a first vehicle 102, a second vehicle 104, a mobile device 106, a service provider 108, and a network 110.

In order to explain some features of the present disclosure, the first vehicle 102 will be assumed to be a large sports utility vehicle, such as a FORD Explorer™ whereas the second vehicle 104 is a relatively smaller crossover vehicle such as a FORD Escape™. Again, these descriptions are not intended to be limiting.

Some or all of these components in the architecture 100 can communicate with one another using the network 110. The network 110 can include combinations of networks that enable the components in the architecture 100 to communicate with one another. The network 110 may include any one or a combination of multiple different types of networks, such as cellular, cable, the Internet, wireless networks, and other private and/or public networks. In some instances, the network 110 may include Wi-Fi or Wi-Fi direct.

It will be understood that while two vehicles are shown, the systems and methods disclosed herein can be adapted for use with a single vehicle or a plurality of vehicles. The first vehicle 102 can include a controller 112, a communications module 114, a liftgate 116, a liftgate sensor 118, and an HMI 120. The controller 112 comprises a processor 122 and memory 124. The processor 122 executes instructions stored in memory 124 to provide any of the functions disclosed herein. When referring to functions performed by the controller 112, it will be understood that this includes execution of instructions stored in memory 124 by the processor 122. The controller 112 can access the network 110 using the communications module 114.

It will be understood that the second vehicle 104 can be configured similarly to the first vehicle 102 and includes a liftgate 126. For context, the liftgate 116 of the first vehicle 102 has a maximum opening height H1 that can be measured relative to a ground plan $G_P$. In contrast, the liftgate 126 of the second vehicle 104 has a maximum opening height H2 that can be measured relative to the ground plan $G_P$. The maximum opening height H2 of the second vehicle 104 is shorter than the maximum opening height H1 of the first vehicle 102.

As will be discussed in greater detail herein, the first vehicle 102 and the second vehicle can be adapted to utilize a common and customized liftgate opening height. The customized liftgate opening height can be stored in a user account 128 stored at the service provider 108. Both the first vehicle 102 and the second vehicle 104 are linked to the user account 128. In some instances, the customized liftgate opening height can be stored at the mobile device 106 level. For example, the mobile device 106 can execute an application 130 that allows the mobile device to access information stored in the user account 128. This information can be stored locally on the mobile device as well.

Prior to establishing the customized liftgate opening height, the liftgate opening height can be set to the default position (e.g., default opening height), which can include the maximum liftgate opening height. In some instances, the user can select or enter their preferred customized liftgate opening height into the HMI 120 or their mobile device 106, if known.

Figure 3:
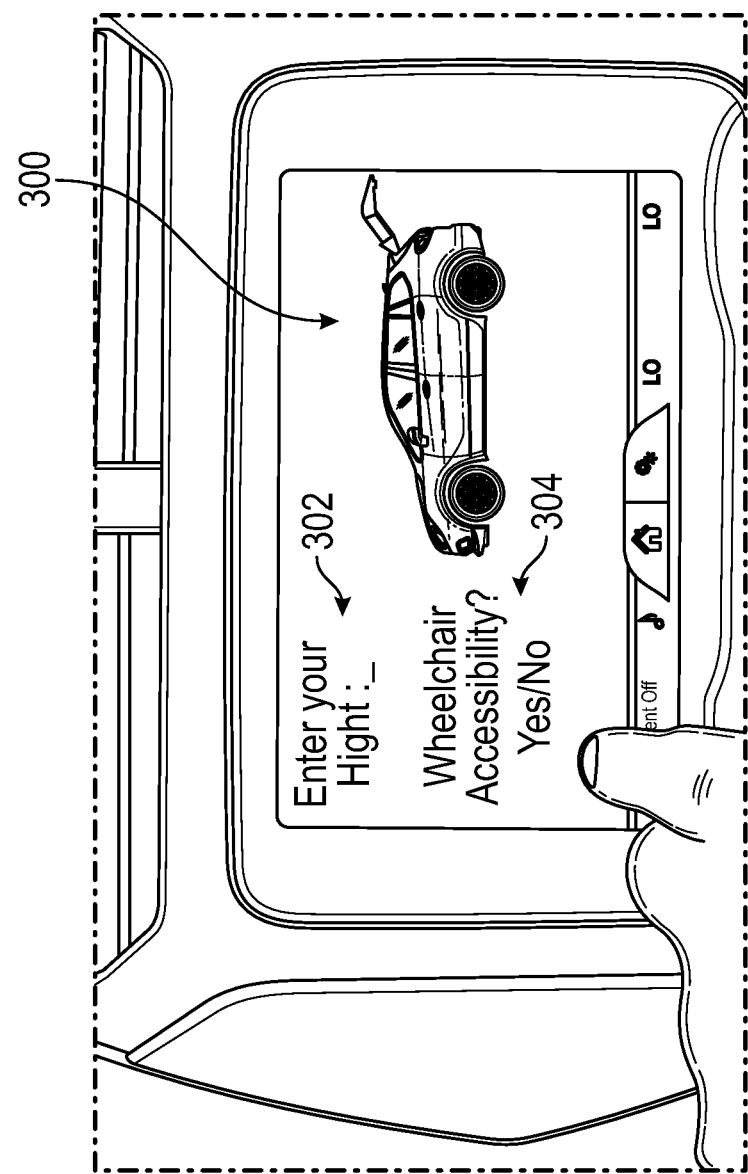
FIG. 3 illustrates a preview of a liftgate opening height displayed on a human-machine interface.

If not known, the controller 112 can execute a discovery process to determine the customized liftgate opening height. Referring to FIGS. 1 and 3, the controller 112 can present a preview 300 of the customized liftgate opening height on the HMI 120 or the mobile device 106. The HMI 120 can be configured to provide the user with graphical user interfaces that provide the preview 200 and/or receive data from the user.

The user can selectively adjust the liftgate opening height to their preferred position through input into the HMI 120 or mobile device 106. As the user changes the liftgate opening height, the controller 112 can cause the liftgate 116 to raise and/or lower as the user input is received. In some instances, this discovery mode is available when the first vehicle 102 is turned on and the transmission of the first vehicle 102 is in park. In another example, the user can select their customized liftgate opening height by physically manipulating the liftgate 116.

The user can provide anthropometric measurements such as height 302 and physical limitations 304 that are used to determine the customized liftgate opening height. The physical limitations 304 can include a toggle that indicates whether the user has a physical disability or not. For example, the HMI 120 can be configured to query the user as to whether they utilize a wheelchair. A user can enter one or more anthropometric measurements into the HMI 120 or their mobile device 106. Example anthropometric measurements include, but are not limited to, user height, leg and/or torso length, and the like. Anthropometric measurements provide a basis for determining the customized liftgate opening height.

Referring back to FIGS. 1 and 2, in one example, the customized liftgate opening height $H_C$ of the first vehicle 102 is lower than the maximum opening height H1. Again, these height measurements can be made relative to the ground plan $G_P$. In this example, the customized liftgate opening height $H_C$ of the first vehicle 102 is substantially equal to the maximum height H2 of the second vehicle 104. It will be understood that this is a non-limiting example of how the liftgate opening heights of two vehicles can be standardized.

The distance between the liftgate 116 and the ground plane $G_P$ can be based on output of the liftgate sensor 118. The liftgate sensor 118 can include any suitable sensor that can provide a distance measurement such as a laser, LiDAR, and ultrasonic—just to name a few. The liftgate sensor 118 can be integrated into the liftgate 116 in such a way that the liftgate sensor 118 can emit radiation and/or signals towards the ground plane $G_P$.

Regardless of the method used to determine the customized liftgate opening height $H_C$, once the customized liftgate opening height $H_C$ has been determined, the customized liftgate opening height $H_C$ can be stored and for use across a plurality of vehicles associated with the user account 128. Thus, when the user utilizes the first vehicle 102, the customized liftgate opening height $H_C$ is applied to limit movement of the liftgate 116 to match the customized liftgate opening height $H_C$. When the user utilizes the second vehicle 104, the customized liftgate opening height $H_C$ is applied to limit movement of the liftgate 126 to match the customized liftgate opening height $H_C$. Again, the customized liftgate opening height $H_C$ is measured relative to the ground plane $G_P$, so relatively speaking, the liftgate 126 of the second vehicle 104 may travel further than the liftgate 116 of the first vehicle 102 because the second vehicle 104 overall has a height that is less than the first vehicle 102. In this example, the customized liftgate opening height $H_C$ is six feet. If the user is handicapped and utilizes a wheelchair, the customized liftgate opening height $H_C$ could be five feet, for example.

Figure 4:
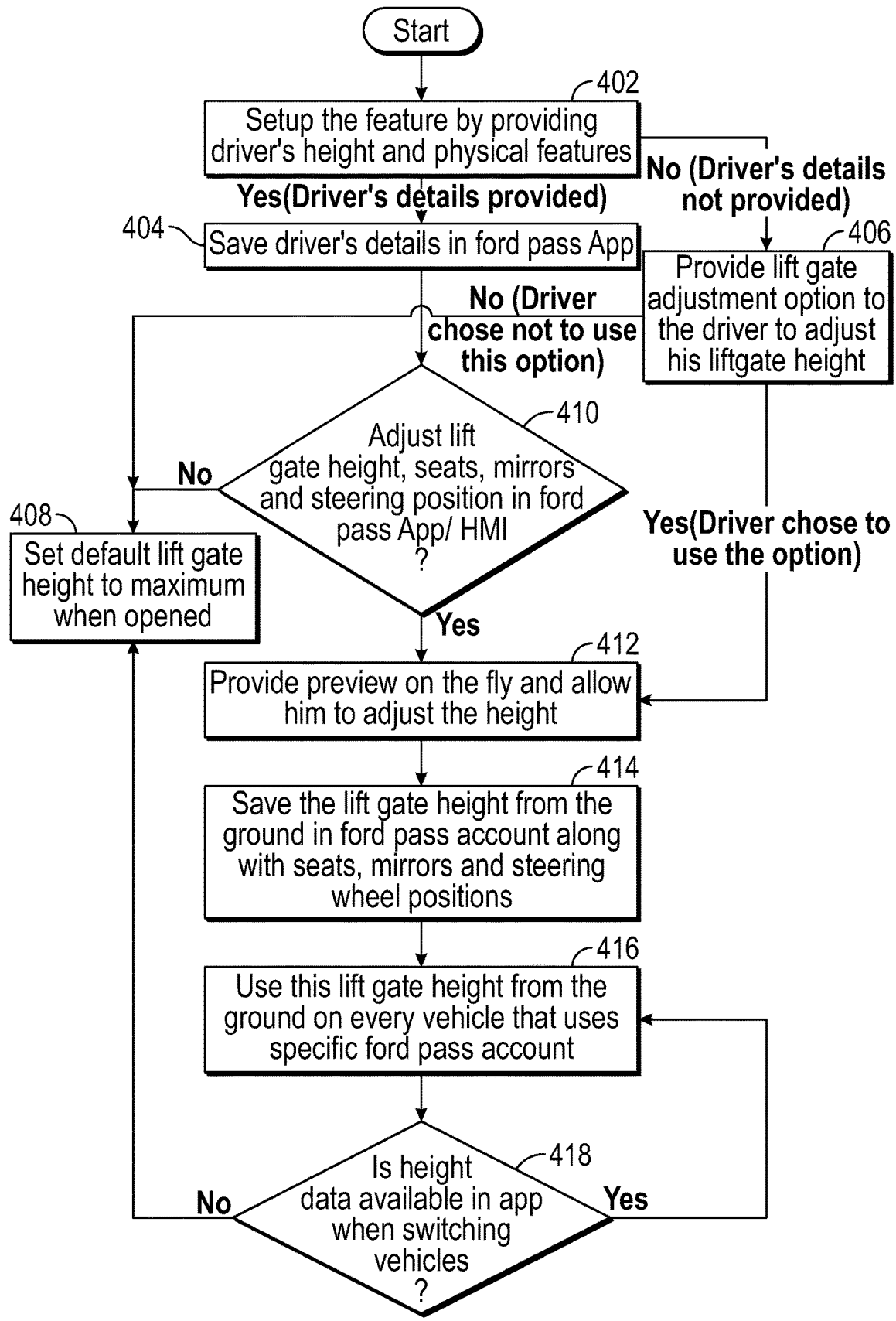
FIG. 4 is a flowchart of an example method of the present disclosure.

FIG. 4 is a flowchart of an example method of the present disclosure. The method can include a step 402 of setting up the liftgate opening height feature by receiving user/driver height and/or physical condition (e.g., wheelchair user). Again, these data are referred to as anthropometric measurements or data. If anthropometric measurements are available, these anthropometric measurements are stored in a user account in step 404. Again, the user can store their information on an application executing on their mobile device or at a service provider. If the anthropometric measurements or data are not available, the liftgate adjustment options are provided to the user/driver to set the customized liftgate opening height in step 406.

If the driver chooses not to use this option in step 406, the liftgate opening height can be set to a default value, which can be a maximum liftgate opening height in step 408. When the user/driver has stored their anthropometric measurements or data, the anthropometric measurements or data can be applied in step 410 to adjust a liftgate height, as well as the position of other vehicle components such as mirrors, seats, steering wheel, and the like.

The method can include providing a preview of the customized liftgate opening height on an HMI or mobile device application in step 412. That is, a representation of the liftgate set to the customized liftgate opening height can be displayed. The user can also selectively adjust the customized liftgate opening height to create an updated, customized liftgate opening height in step 412. If the user updates the customized liftgate opening height, the updated, customized liftgate opening height is saved in their user account in step 414. Step 416 involves using the customized liftgate opening height for every vehicle having a liftgate that is associated with a user account. In step 418, a check is performed to determine if a customized liftgate opening height is available when the user switches between vehicles associated with their user account.

Figure 5:
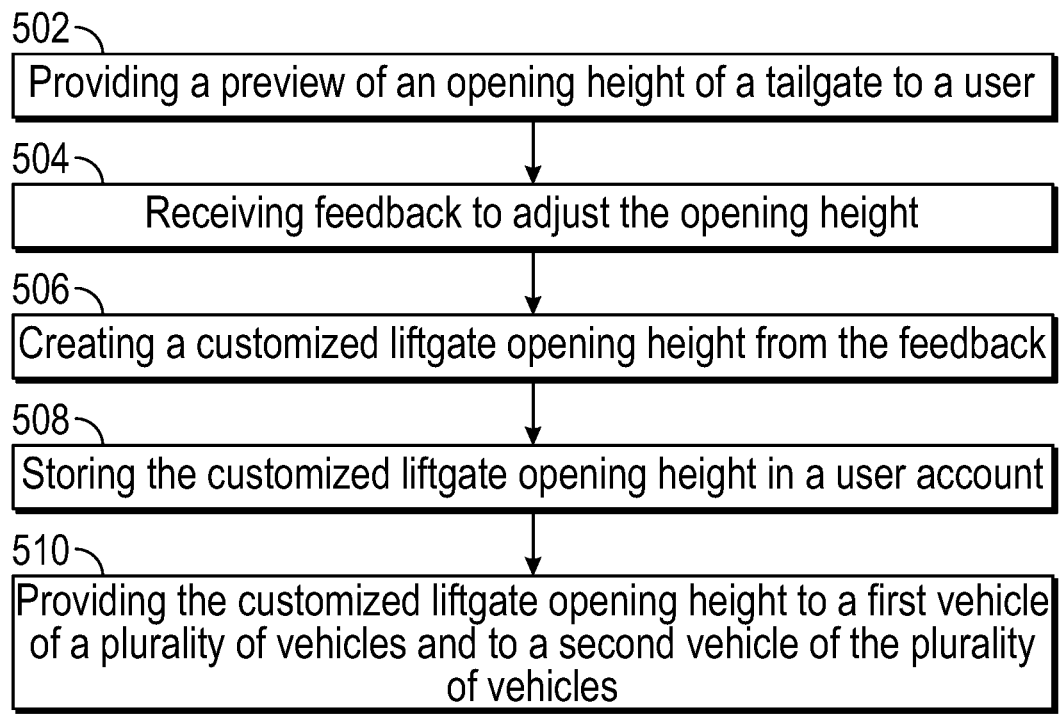
FIG. 5 is a flowchart of another example method of the present disclosure.

FIG. 5 is a flowchart of another example method. The method includes a step 502 of providing a preview of an opening height of a tailgate to a user. To be sure, the opening height is defined by the distance of the liftgate that is measured relative to a ground plane. The preview can be provided on an HMI or mobile device. In some instances, the user can selectively adjust the tailgate in the preview. Thus, the method includes a step 504 of receiving feedback to adjust the opening height. The method includes a step 506 of creating a customized liftgate opening height from the feedback, as well as a step 508 of storing the customized liftgate opening height in a user account. This customized liftgate opening height can be shared with other vehicles that belong to a user account of the user.

The method can include a step 510 of providing the customized liftgate opening height to a first vehicle of a plurality of vehicles and to a second vehicle of the plurality of vehicles. It will be understood that the second vehicle has a maximum liftgate position relative to the ground plane that is different from a maximum liftgate position of the first vehicle relative to the ground plane.

In general, the method can include providing the customized liftgate opening height to each of a plurality of vehicles associated with the user account. Again, at least a portion of the plurality of vehicles has unique maximum liftgate positions relative to one another. Each of the vehicles may have different overall heights relative to one another that may affect liftgate distance relative to the ground plane.

The method can also include providing a graphical user interface to receive the feedback from the user to adjust the customized liftgate opening height. The graphical user interface can also be used to receive an anthropometric measurement for the user. In some instances, the customized liftgate opening height is selectively adjusted based on the anthropometric measurement. In addition to adjusting liftgate opening height, the anthropometric measurement can be used to select a position or setting for other vehicle components such as mirrors, steering wheel, pedals, and the like. In one example, the anthropometric measurement for the user can be based on seat position setting(s). A user height could be estimated by determining a seat position away from the steering wheel and/or gas/brake pedals. Thus, the customized liftgate opening height can be based on an inferred user height determined from other vehicle component settings when anthropometric measurement(s) cannot be obtained from the user directly.

Figure 6:
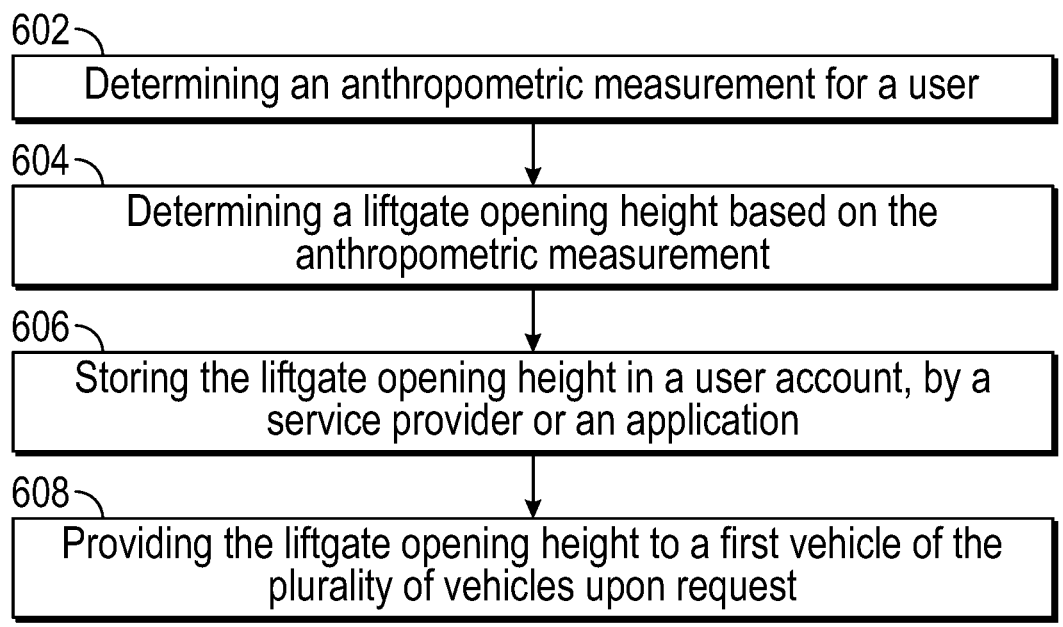
FIG. 6 is a flowchart of yet another example method of the present disclosure.

FIG. 6 is a flowchart of yet another example method of the present disclosure. The method can include a step 602 of determining an anthropometric measurement for a user. The anthropometric measurement can include a height of the user and/or an indication as to whether the user is physically disabled.

In some instances, the method can include a step 604 of determining a liftgate opening height based on the anthropometric measurement. As noted above, the liftgate opening height is measured relative to a ground plane. In one example, a distance sensor mounted in the liftgate measures the distance to the ground plane.

The method can include a step 606 of storing the liftgate opening height in a user account, by a service provider or an application. Again, the user account may be associated with a plurality of vehicles. Next, the method can include a step 608 of providing the liftgate opening height to a first vehicle of the plurality of vehicles upon request. It will be understood that the liftgate opening height can be shared and implemented amongst each of the plurality of vehicles that have liftgates.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   displaying an opening height of a tailgate to a user, wherein the opening height comprises a distance that is measured relative to a ground plane;
   receiving feedback to adjust the opening height;
   creating a customized liftgate opening height from the feedback;
   storing the customized liftgate opening height in a user account; and providing the customized liftgate opening height to a first vehicle of a plurality of vehicles and to a second vehicle of the plurality of vehicles, wherein the second vehicle has a maximum liftgate position relative to the ground plane that is different from a maximum liftgate position of the first vehicle relative to the ground plane.

2. The method according to claim 1, further comprising providing the customized liftgate opening height to each of a plurality of vehicles associated with the user account, wherein at least a portion of the plurality of vehicles have unique maximum liftgate positions relative to one another.

3. The method according to claim 1, further comprising providing a graphical user interface to receive the feedback from the user to adjust the customized liftgate opening height.

4. The method according to claim 1, further comprising:
receiving an anthropometric measurement for the user; and
selectively adjusting the customized liftgate opening height based on the anthropometric measurement.

5. The method according to claim 4, further comprising utilizing the anthropometric measurement to selectively adjust a position of another vehicle component.

6. A method, comprising:
determining an anthropometric measurement for a user;
determining a liftgate opening height based on the anthropometric measurement, wherein the liftgate opening height is measured relative to a ground plane;
storing the liftgate opening height in a user account by a service provider or an application, wherein the user account is associated with a plurality of vehicles; and
providing the liftgate opening height to a first vehicle of the plurality of vehicles upon request.

7. The method according to claim 6, further comprising providing a preview of the liftgate opening height to the user on a human-machine interface of a vehicle or the application executing on a mobile device.

8. The method according to claim 6, further comprising:
receiving feedback from the user to adjust the liftgate opening height and create an updated liftgate opening height; and
storing the updated liftgate opening height in the user account.

9. The method according to claim 6, further comprising transmitting the liftgate opening height to a second vehicle of the plurality of vehicles, wherein the second vehicle has a maximum liftgate position relative to the ground plane that is different from a maximum liftgate position of the first vehicle relative to the ground plane.

10. The method according to claim 6, further comprising providing a graphical user interface to the user to obtain the anthropometric measurement.

11. The method according to claim 6, further comprising adjusting a position of one or more vehicle components based on the anthropometric measurement.

12. A vehicle, comprising:
a distance sensor that measures a distance between a liftgate and a ground plane; and
a controller comprising a processor and memory for storing instructions, the processor executing the instructions to:
determine an anthropometric measurement for a user;
determine a customized liftgate opening height of the liftgate based on the anthropometric measurement, wherein the customized liftgate opening height is measured relative to the ground plane;
cause the liftgate to open to the customized liftgate opening height based on output of the distance sensor; and
transmit the customized liftgate opening height to a service provider that stores the customized liftgate opening height in a user account, wherein the user account is associated with a plurality of vehicles, and wherein each of the plurality of vehicles has a unique maximum liftgate position relative to one another.

13. The vehicle according to claim 12, wherein the processor is configured to provide a preview of the customized liftgate opening height to the user on a human-machine interface of the vehicle or an application executing on a mobile device.

14. The vehicle according to claim 12, wherein the processor is configured to:
receive feedback from the user to adjust the customized liftgate opening height and create an updated liftgate opening height; and
store the updated liftgate opening height in a user account.

15. The vehicle according to claim 12, wherein the processor is configured to transmit the customized liftgate opening height to each of the plurality of vehicles upon request.

16. The vehicle according to claim 12, wherein the processor is configured to provide a graphical user interface to the user to obtain the anthropometric measurement.

17. The vehicle according to claim 12, wherein the processor is configured to adjust a position of one or more vehicle components based on the anthropometric measurement.

18. The vehicle according to claim 12, wherein the customized liftgate opening height is different from a default opening height for the liftgate, the default opening height being a maximum height for the liftgate.

19. A method, comprising:
displaying an opening height of a tailgate to a user, wherein the opening height comprises a distance that is measured relative to a ground plane;
receiving feedback to adjust the opening height;
creating a customized liftgate opening height from the feedback;
storing the customized liftgate opening height in a user account; and
providing the customized liftgate opening height to each of a plurality of vehicles associated with the user account, wherein at least a portion of the plurality of vehicles have unique maximum liftgate positions relative to one another.

20. A method, comprising:
displaying an opening height of a tailgate to a user, wherein the opening height comprises a distance that is measured relative to a ground plane;
receiving feedback to adjust the opening height;
creating a customized liftgate opening height from the feedback;
storing the customized liftgate opening height in a user account;
receiving an anthropometric measurement for the user;
selectively adjusting the customized liftgate opening height based on the anthropometric measurement; and
utilizing the anthropometric measurement to selectively adjust a position of another vehicle component.

* * * * *